United States Patent

Balasubramanian

[11] 4,398,787
[45] Aug. 16, 1983

[54] OPTICAL LEVERAGE TELECENTRIC SCANNING APPARATUS

[75] Inventor: N. Balasubramanian, Saratoga, Calif.

[73] Assignee: The United States of America as represented by the Secretary of the Army, Washington, DC

[21] Appl. No.: 274,602

[22] Filed: Jun. 17, 1981

[51] Int. Cl.³ .................................. G02B 27/17
[52] U.S. Cl. ............................................ 350/6.4
[58] Field of Search ................................. 350/6.4

[56] References Cited

U.S. PATENT DOCUMENTS

| | | |
|---|---|---|
| 3,469,030 | 9/1969 | Priebe . |
| 3,511,551 | 5/1970 | Matulka ......................... 350/6.4 |
| 3,619,028 | 11/1971 | Keese et al. . |
| 3,790,246 | 2/1974 | Pickering . |
| 3,816,652 | 6/1974 | Barnett . |
| 3,835,249 | 9/1974 | Dattilo et al. . |
| 3,909,105 | 9/1975 | Neiswander et al. . |
| 3,910,675 | 10/1975 | MacGovern . |
| 3,922,485 | 11/1975 | Starkweather et al. . |
| 3,946,150 | 3/1976 | Grafton . |
| 3,995,110 | 11/1976 | Starkweather . |
| 4,008,371 | 2/1977 | Barron . |
| 4,168,126 | 9/1979 | Altman et al. ................. 350/6.4 |

FOREIGN PATENT DOCUMENTS 582490 11/1977 U.S.S.R. ........................ 350/6.4

Primary Examiner—John K. Corbin
Assistant Examiner—Rebecca D. Gass
Attorney, Agent, or Firm—Darrell E. Hollis

[57] ABSTRACT

An optical leverage telecentric scanning apparatus for scanning a large format film transparency at a given location is disclosed, wherein the scan pattern from the transparency is detected for optical power spectrum analysis. The scanning apparatus includes a collimated laser beam supply and a refraction device for laterally translating the collimated beam across the transparency. To magnify the collimated beam, an optical leverage device is provided including a first lens arranged between the laser beam supply device and the refraction device, and a scanning concave parabolic mirror arranged between the diffraction device and the transparency. The degree of magnification afforded by the optical leverage device is equal to the ratio of the focal lengths of the mirror to the first lens, respectively. A detector arranged on the opposite side of the transparency from the refraction device detects the scan pattern produced by the laser beam passing through the transparency.

7 Claims, 3 Drawing Figures

OPTICAL LEVERAGE TELECENTRIC SCANNING APPARATUS

STATEMENT OF GOVERNMENT INTEREST

The invention described and claimed herein may be manufactured and used by or for the Government of the United States of America for governmental purposes without the payment of royalties thereon or therefor.

BRIEF DESCRIPTION OF THE PRIOR ART

Optical scanning systems are well known in the patented prior art as evidenced by the U.S. Pat. Nos. to Priebe 3,469,030, Pickering 3,790,246, and McGovern 3,910,675. The Priebe patent discloses an optical scanner for scanning a small spot of light across a target. In order to keep the scanning spot in focus, a collimated light and a curved mirror are employed. Scanning of the light beam results from a rotating polygon scanner having a plurality of mirrored surfaces. The Pickering U.S. Pat. No. 3,790,246 discloses a X-Y optical scanning system including two rotating deflecting elements the axes of which are substantially mutually perpendicular. A pair of concave spherical mirrors are provided to image the deflecting elements at a lens to produce a distortion-free image on a flat storage medium. Finally, the McGovern patent discloses a laser scanning apparatus wherein a laser directs a collimated beam through a plurality of prisms to commence the beam scan. A beam expanding optical system enlarges the beam to the diameter desired for the scanning operation.

While the prior scanning devices normally operate quite satisfactorily, they do possess the inherent drawback of not being able to rapidly scan a large format film transparency for optical power spectrum analysis. The rapid sampling of two-dimensional film format for optical power spectrum analysis normally requires either the translation of the film over a sampling aperture or the translation of the sampling aperture over the film format with the film remaining stationary. Whenever large format films are involved, the mechanical translation of the film transport system over the optical scanning aperture is slow and cumbersome. Recent advances in laser scanning techniques as outlined above have made the translation of the optical sampling aperture over the film format an attractive alternative. The telecentric laser scanner of the present invention has been developed for application to high speed optical power spectrum analysis of large aerial transparencies.

SUMMARY OF THE INVENTION

Accordingly, it is a primary object of the present invention to provide an optical leverage telecentric scanning apparatus for scanning a large format film transparency for optical power spectrum analysis. The apparatus includes a laser source and a spatial filter collimator for collimating the laser beam. A refraction device laterally translates the collimated beam to scan the transparency. An optical leverage system including a first lens and a parabolic mirror is provided for magnifying the collimated beam. The degree of magnification afforded by the optical leverage system is equal to the ratio of the focal length of the mirror to the focal length of the first lens. A detector arranged on the opposite side of the transparency from the refraction device detects the scan pattern produced by the laser beam passing through the transparency for optical power spectrum analysis thereof.

In accordance with a more specific object of the invention, the refraction device comprises a pair of rotating polygonal prisms the axes of which are arranged perpendicularly to rapidly scan the area of the transparency.

According to a further object of the invention, the spatial filter collimator comprises a pair of lenses arranged in afocal relation and having an apertured member arranged therebetween, the diameter of the collimated laser beam being related to the size of the aperture.

BRIEF DESCRIPTION OF THE FIGURES

Other objects and advantages of the invention will become apparent from a study of the following specification when viewed in the light of the accompanying drawing, in which.

DETAILED DESCRIPTION

Figure 2:
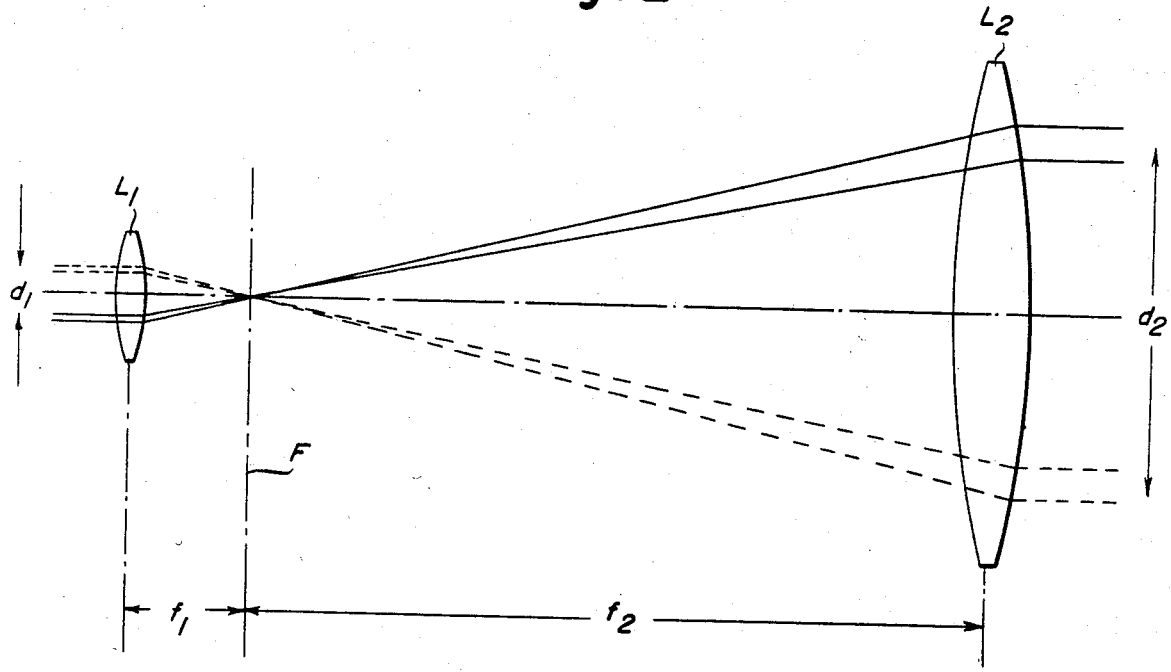
FIG. 2 is a schematic diagram of a pair of lenses in afocal relation.

The principle of operation of an optical leverage telecentric scanner is best illustrated in FIG. 2. A pair of converging lenses $L_1$, $L_2$ define an afocal system wherein the distance between the lenses is equal to the sum of their focal lengths $f_1$ and $f_2$ respectively. When arranged in afocal relation, the back focal plane of lens $L_1$, coincides with the front focal plane of lens $L_2$ as shown at $F$. If a collimated light beam is incident on lens $L_1$, the output beam from lens $L_2$ will also be collimated, and the magnification of the system (i.e., the ratio of the diameter of the incident beam) will be $(-f_2/f_1)$. Where the input beam to an afocal system is translated laterally, there will be a similar lateral translation of the output beam in the opposite direction. The ratio of beam displacement is given by $$\frac{d_2}{d_1} = \frac{f_2}{f_1}$$

where $d_1$ and $d_2$ are the lateral displacements of the input and output beams, respectively. Thus, the output beam displacement is given by the equation $$d_2 = \frac{f_2}{f_1} d_1.$$

By using lenses $L_1$ and $L_2$ where the focal length $f_2$ is much greater than the focal length $f_1$, the ratio $f_2/f_1$, is large and hence a small displacement in the incident beam $d_1$ will result in a large displace of the output beam $d_2$. In an optical leverage telecentric scanner, an afocal system is preferred whereby a small displacement of an incident beam results in a large displacement of the output beam used to scan a large transparency.

Figure 3:
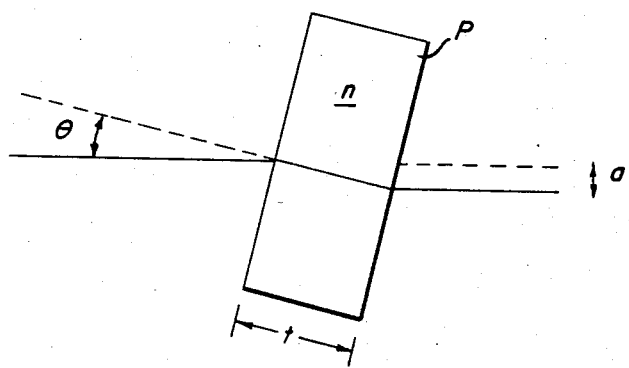
FIG. 3 is a schematic diagram of a beam translation through a polygonal prism.

In order to provide the necessary displacement of an input beam for the scanning operation, a refraction device is provided, the principle of which will be developed with reference to FIG. 3. Optimum displacement for optical leverage telecentric scanning applications requires linear translation which is rapid and yet insensitive to deviation from the translation axis and to small angular rotation during translation. To this end, a refracting rectangular glass plate P is employed, the rotation of which in the path of a collimated beam results in the lateral translation of the transmitted beam due to refraction. The plate P has an index of refraction n and a thickness t. The lateral displacement a of the collimated beam is given by the equation $$a = t \sin \theta \left[ 1 - \frac{\cos \theta}{[n^2 - \sin^2\theta]} \right]$$

where $\theta$ is the angle of rotation of the plate.

In a polygonal prism having an even number of sides, the transmission of the optical beam through opposite sides of the prism simulates the plate P of FIG. 3, and therefore, rotation of the prism results in the lateral translation of the transmitted beam. Because the prism always rotates in one direction, the lateral translation of the beam will always be in one direction with no retrace of the beam. The time delay between the end of one scan and the beginning of the next is determined by the crossover of the input beam from one facet to the next. Therefore the time delay can be reduced through use of a multifaceted prism. Since the input beam diameter is smaller than the scan aperture by a factor determined by the optical magnification, there is no need to make the polygonal prism large to achieve near 100% duty cycle.

OPTICAL LEVERAGE TELECENTRIC SCANNER

Figure 1:
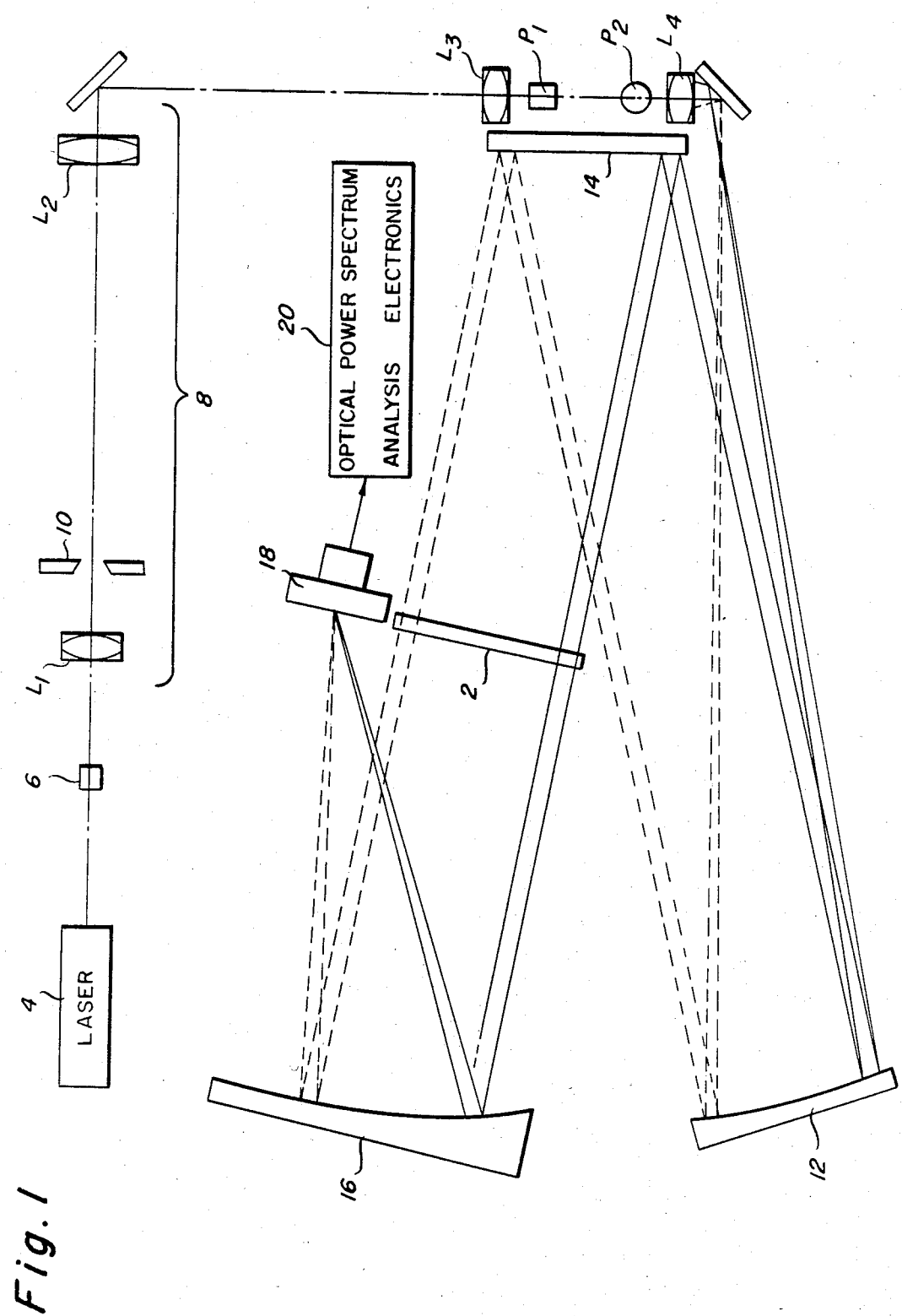
FIG. 1 is a schematic diagram of the optical leverage telecentric scanner.

The optical leverage telecentric scanner as shown in FIG. 1 is arranged to rapidly scan a large format film transparency 2 at a given location. Although any suitable optical beam may be provided for the scanning operation, a laser beam produced from a laser source 4 is preferred. The laser beam is delivered to a beam expander 6 and then to a spatial filter collimator system 8 which collimates the beam and defines the diameter thereof. The spatial filter collimator system 8 comprises a pair of lenses $L_1$ and $L_2$ arranged in afocal relation to produce a small diameter collimated beam as discussed above with regard to FIG. 2. An apertured member 10 is arranged between the afocal lenses $L_1$ and $L_2$ to define the diameter of the collimated beam as will be developed more fully below.

The collimated laser beam from the spatial filter collimator 8 is next refracted and magnified prior to scanning the transparency. The refraction device of the scanning apparatus is used to laterally translate the beam as discussed above with regard to FIG. 3. Specifically, the refraction device comprises a pair of rotating polygonal prisms $P_1$ and $P_2$, the axes of rotation of which are perpendicularly arranged. Thus one of the rotating prisms will laterally translate the collimated beam in a first direction while the other rotating prism will laterally translate the collimated beam in a second direction normal to the first direction, whereby the area of the transparency will be scanned.

The collimated beam is magnified by an optical leverage system comprising a lens $L_3$ arranged between the spatial filter collimator 8 and the first rotating prism $P_1$ and a concave parabolic mirror 12 arranged between the second rotating prism $P_2$ and the transparency 2. A lens $L_4$ is also provided to keep the beam in focus. The degree of magnification M of the scanning beam is given by the equation $$M = \frac{f_p}{f_3}$$

where $f_p$ is the focal length of the parabolic mirror 12 and $f_3$ is the focal length of the lens $L_3$. A plane mirror 14 directs the collimated beam through the transparency 2. The mirror 14 is arranged so that the beam passes through the transparency normal to the plane thereof, and the collimated beam upon passing through the transparency 2 produces a scan pattern of the transparency. A transform concave parabolic mirror 16 arranged on the opposite side of the transparency 2 from the optical leverage system and refraction device focuses the scan pattern onto a detector 18 which delivers the scan pattern to optical power spectrum analysis electronics 20.

Control of the diameter of the scanning beam for scanning large film format transparencies of different dimensions is afforded by varying the size of the aperture in the apertured member 10. Thus, the scanning beam diameter $d_b$ is given by the equation $$d_b = \frac{f_p}{f_1} d_a$$

where $d_a$ is the diameter of the aperture.

For optical power spectrum analysis application, the parameters of the telecentric laser scanner which are most important are: (1) the angular deviation of the direction of propagation of the collimated beam; and (2) the changes in the phase distribution across the wavefront of the scanning beam. The angular deviation of the beam results in the lateral displacement of the origin of the power spectrum and, depending upon the sampling of the power spectrum, can result in error in measurement for a stationary detector. The phase distortions associated with the wavefront alter the impulse responses of a Fourier transforming system and hence can result in modification of the power spectrum distribution. The optical telecentric laser scanner illustrated in FIG. 1 has been designed to minimize the above problems, and the crucial components of the system are the rotating polygonal prisms, the lens $L_3$, and the parabolic mirror 12.

The size of the rotating polygonal prisms and the number of facets provided thereon are determined from the requirements for scan width before magnification, the scan speed, and the dead time between scans. The scan width is determined by the distance between facets and the angle subtended by a facet. For a given spindle speed, the scan speed is determined by the number of facets in the prism, and the dead time between scans is determined by the ratio of beam diameter to the width of the facet. The scan width w is given by the equation $$w = 2 \times \sin \frac{\alpha}{2}$$

where x is the distance between facets and $\alpha$ is the angle subtended by the facet at the center. The scan speed s is given by the equation $$s = N \frac{360}{\alpha}$$

where N is the number of revolutions per second of the spindle. Thus, for a given scan width, the size and number of facets of the prism must be optimized against the scan speed and the spindle rotation speed.

The parallelism of opposite sides of the rotating polygonal prisms directly determines the angular deviation of the transmitted beam and therefore is critically important. The optical transmission quality of the prism is also important since it directly determines the phase distribution of the wavefront. However, the wobble associated with the spindle rotation does not have a significant effect on the scanner performance which is one of the unique characteristics of the present invention.

The lens $L_3$ comprises the short end of the optical leverage system and must exhibit negligible spherical aberration over the scanning aperture defined by the scan amplitude. The effect of spherical aberration is to introduce angular deviation of the telecentric scanning beam. Since at any instant of time the lens will operate with a large focal length in focusing the beam, the aberration characteristics will be negligible. When the spherical aberration requirement is met, the requirement relative to changes in phase distribution of the scanning beam is automatically satisfied. A good collimating lens $L_4$ mounted precisely on axis provides the necessary performance.

The quality of the surface of the parabolic mirror is not critical with regard to wavefront aberration since only a small aperture is used at any given time. However, since the telecentricity of the scanning beam is critical, the deviation of the slope of the surface of the mirror from that of a perfect parabola must be smaller than two times the required angular deviation tolerance. Hence the surface figure tolerance of the parabolic mirror as a whole is critical.

For an ideal system, the tolerance of angular deviation of the collimated beam is given by the equation $$\Delta \theta = \frac{\lambda}{d_b}$$

where $\lambda$ is the beam wavelength. This angular tolerance can be divided equally between the scanning system's three critical components, namely, the rotating polygonal prism, the lens $L_3$, and the parabolic mirror. Thus, the tolerance specification is determined by the following factors:

(a) the slope error on a plane wavefront generated by the parabolic mirror with a point source at the focus should be less than $\lambda/3\ d_b$;
(b) the slope error on a plane wavefront generated by the lens $L_3$ with a point source at its focus should be less than $\lambda/3\ d_b$; and
(c) a plane wave transmitted through any opposite facets of the prism should deviate less than $\lambda/3\ d_b$ in angle from the direction of propagation.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. Optical leverage telecentric scanning apparatus for scanning a large format film transparency for optical power spectrum analysis, comprising
   (a) means supporting the transparency at a given location;
   (b) means supplying a collimated laser beam;
   (c) refraction means for laterally translating said collimated beam across the transparency;
   (d) optical leverage means for magnifying said collimated beam, said optical leverage means including
      (1) a first lens arranged between said laser beam supply means and said refraction means, and
      (2) a concave parabolic mirror arranged between said refraction means of magnification afforded by said first lens and said mirror being equal to the ratio of the focal lengths of said mirror to said first lens, respectively;
   (e) detector means arranged on the opposite side of the transparency from said refraction means for detecting the scan pattern produced by the laser beam which is passed through the transparency, whereby said refraction means and said optical leverage means produce a magnified scan pattern for optical power spectrum analysis of said transparency; and a transform concave parabolic mirror arranged between the transparency and said detector means for focusing said scan pattern from the transparency on said detector means.

2. Apparatus as defined in claim 1, wherein said refraction means comprises rotating polygonal prism means.

3. Apparatus as defined in claim 2, wherein said rotating polygonal prism means comprises a pair of polygonal prisms the axes of which are arranged perpendicularly, whereby one of said pair of prisms laterally translates said scanning beam along a first axis, and the other of said pair of prisms translates said scanning beam along a second axis perpendicular to said first axis to scan the area of said film transparency.

4. Apparatus as defined in claim 1, wherein said collimated laser beam supply means comprises
   (a) laser beam supply means; and
   (b) spatial filter collimator means for collimating said laser beam.

5. Apparatus as defined in claim 4, wherein said spatial filter collimator means comprises a pair of lenses arranged in afocal relation.

6. Apparatus as defined in claim 4, wherein said spatial filter collimator means further comprises an apertured member arranged between said pair of afocal lenses, whereby the diameter of said collimated scanning laser beam is related to the size of the aperture.

7. Apparatus as defined in claim 1, further including: a mirror arranged between said concave parabolic mirror and said transparency for passing said collimated beam normal to the plane of said transparency.

* * * * *